G. L. BROWNELL.
FRICTION DEVICE FOR TWISTING AND LIKE MACHINES.
APPLICATION FILED SEPT. 23, 1920.

1,409,824.

Patented Mar. 14, 1922.

INVENTOR
George L. Brownell
By Geo. W. Kennedy Jr.
ATTORNEY

UNITED STATES PATENT OFFICE.

GEORGE L. BROWNELL, OF WORCESTER, MASSACHUSETTS.

FRICTION DEVICE FOR TWISTING AND LIKE MACHINES.

1,409,824. Specification of Letters Patent. Patented Mar. 14, 1922.

Application filed September 23, 1920. Serial No. 412,177.

*To all whom it may concern:*

Be it known that I, GEORGE L. BROWNELL, a citizen of the United States, residing at Worcester, in the county of Worcester and Commonwealth of Massachusetts, have invented a new and useful Improvement in a Friction Device for Twisting and like Machines, of which the following, together with the accompanying drawings, is a specification.

My present invention relates to a mechanism for applying friction to the individual strands which are to be twisted together by means of any suitable twisting mechanism. It has for its objects to apply a friction to the individual strands which are twisted together to form a cord, with the friction applied to each strand independently of the other strands. A further object of my invention is to render the friction uniform upon each strand and to facilitate the threading of the friction device. These objects, among others, I accomplish by means of the mechanism hereinafter described and illustrated in the accompanying drawings, in which—

Similar reference characters refer to similar parts in the different figures.

Inasmuch as my present invention relates solely to a mechanism for applying friction to the individual strands of a twisting or similar machine, I have hereinafter described and shown in the accompanying drawings only so much of the twisting mechanism as is necessary to illustrate the nature of my friction device, it being understood that the friction device embodying my present invention is applicable to any known construction of twisting mechanism, the latter however forming no part of my present invention.

Figure 1:
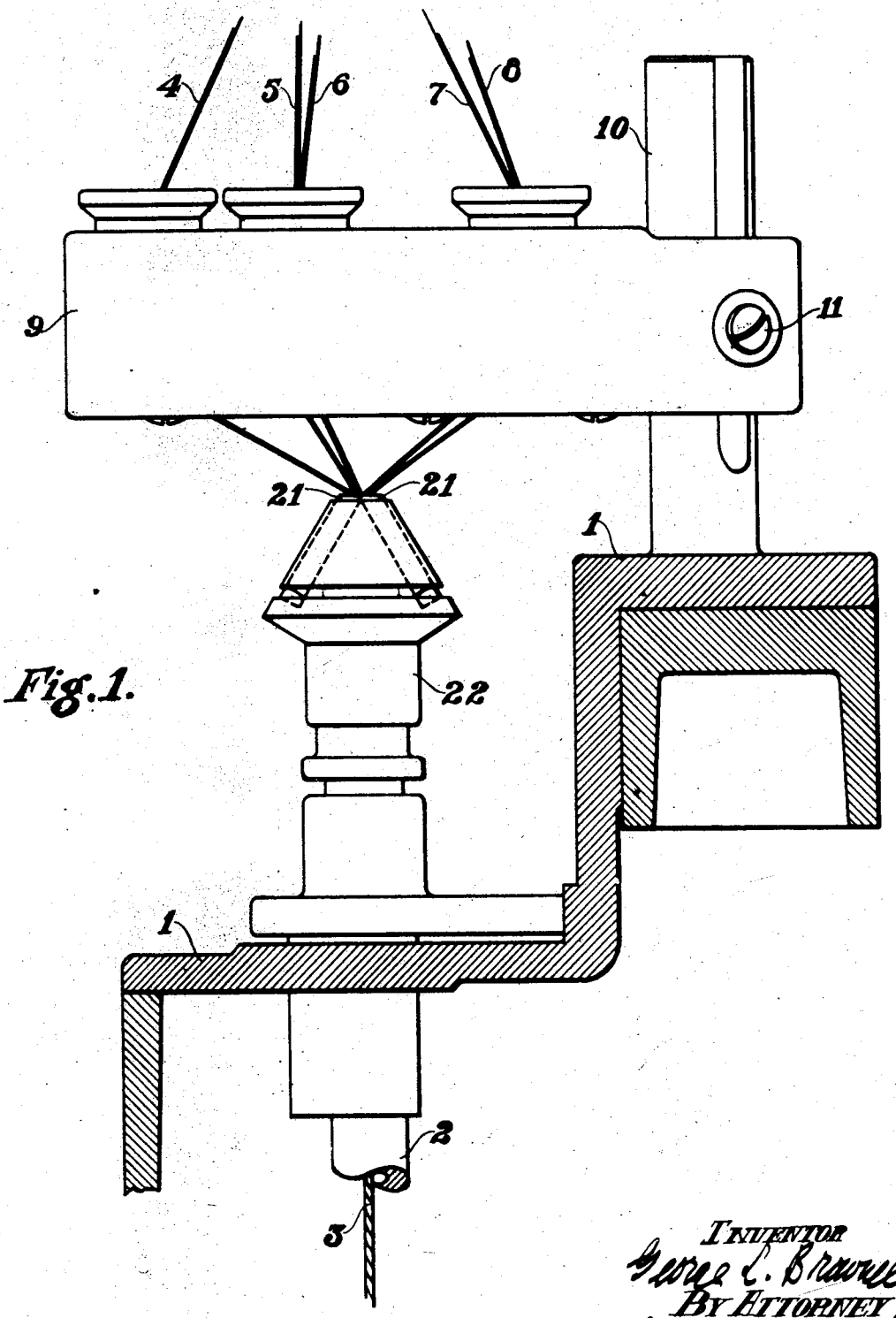
Fig. 1 represents a side view of the friction device embodying my present invention and so much of the twisting mechanism as is necessary to illustrate the operation of my improved friction device.
Figure 2:
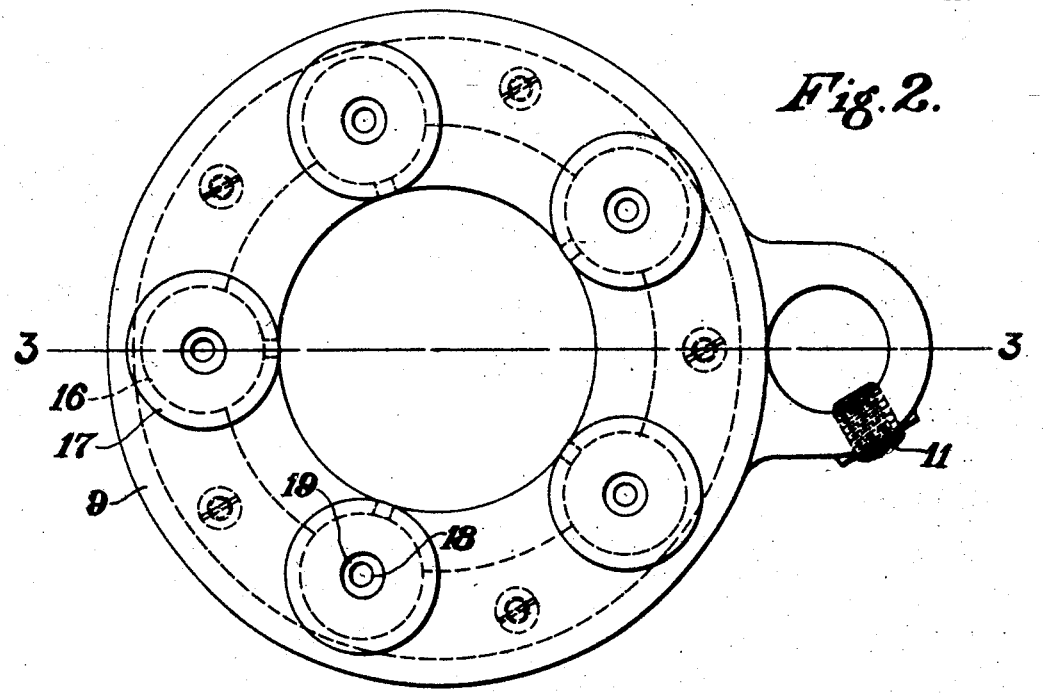
Fig. 2 is a plan view of the friction device detached from the twisting mechanism.
Figure 3:
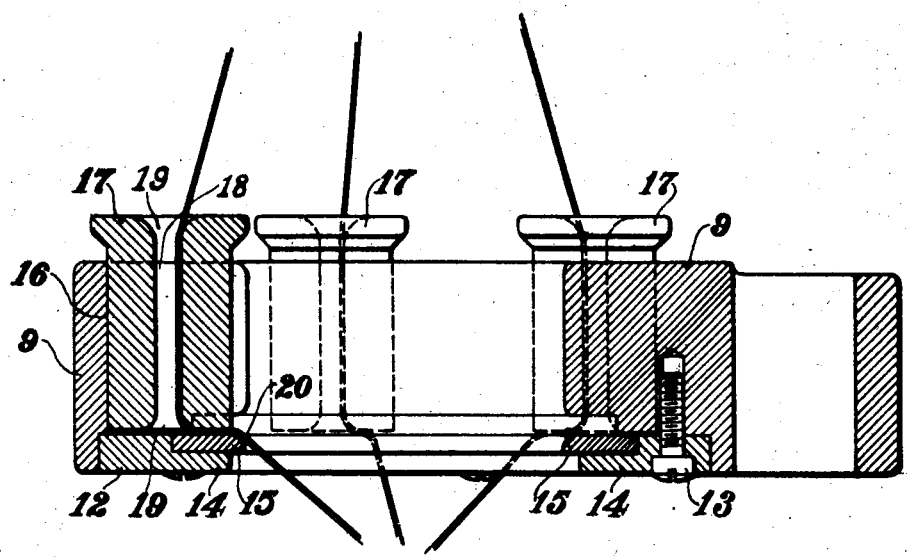
Fig. 3 is a sectional view on the plane of the broken line 3—3, Fig. 2.

Referring to the accompanying drawings, 1, 1 denotes a portion of the framework of a twisting mechanism, shown in sectional view. Journalled in the framework 1 is a revolving hollow spindle 2 through which a cord 3 is conducted, said cord being composed of individual strands, in the present instance five in number and represented at 4, 5, 6, 7 and 8. Each strand is conducted from a spool supported in an overhead creel, not shown, to a friction mechanism shown in side view in Fig. 1 and in plan and sectional views in Figs. 2 and 3. The friction device consists of a ring 9 supported on a stud 10 concentrically with the axis of the revolving spindle 2. The ring 9 is capable of being raised and lowered on the stud 10 and fastened in any desired position by means of a set screw 11. The ring 9 has attached to its under side a flanged annular plate 12 by means of screws 13. Supported on the flange 14 of the plate 12 is a hardened steel ring 15 held loosely on the flange 14 and capable of a slight rotative movement thereon. The ring 9 is provided with a series of holes 16, in the present instance five in number, equally spaced about the ring and each containing a weight 17 resting upon the steel ring 15. Each of the weights 17 is provided with a hole 18 extending through the weight and being flared at its upper and lower ends, as shown at 19, 19. The strands, as they are conducted from their individual spools through the holes 18, are passed between the weights 17 and the steel ring 15, passing over the rounded edge 20 of the ring, and are conducted between the upper ends of pins 21, 21, said pins converging at their upper ends and being forced upwardly by a spring actuated sleeve 22. The pins 21, 21 are in common use in twisting machines and termed a compressor, and they serve to exert a pressure upon the strands passing between them, prior to their being twisted together by means of a flier, not shown, or other suitable twisting mechanism.

Raising or lowering the ring 9 upon the stud 10 enables the angle described by each strand as it approaches the compressor to be varied at will, and the friction exerted upon each strand will be equal as the weights 17 exert a uniform pressure upon the strands as they pass between the bottom of the weights and the ring 15. In case an enlarged portion of a strand, such for example as a knot, passes between one of the weights 17 and the ring 15, the weight will be raised without affecting the friction upon any of the other strands.

I claim,

1. The combination with a twisting mechanism for twisting a multiplicity of strands, of a friction device for the strands to be twisted, comprising a friction ring over which the strands pass to the twisting mechanism, and a separate weight resting upon each individual strand as it passes over said ring.

2. The combination with a twisting mechanism for twisting a multiplicity of strands, of a friction device for each individual strand, comprising a friction ring and an independent weight for applying a friction to each strand as it passes over said ring, with said ring capable of a rotative movement about its own axis.

3. The combination with a twisting mechanism for twisting a multiplicity of strands, of a friction device for applying a separate friction to each strand, comprising a ring held concentrically with the axis of the twisting mechanism, a series of weights held in said ring concentrically with its axis, a friction ring held in said first named ring supporting said weights, said weights having holes therethrough for the passage of a strand over said friction ring to the twisting mechanism.

4. The combination with a twisting mechanism for twisting a multiplicity of strands, of a friction device for applying a friction independently to each strand, comprising a friction ring held concentrically with the axis of the twisting mechanism, means for varying the distance between said ring and the twisting mechanism, and gravity weights for applying a friction to each strand.

Dated this thirteenth day of September, 1920.

GEORGE L. BROWNELL.